(12) United States Patent
Tang

(10) Patent No.: US 10,477,405 B2
(45) Date of Patent: Nov. 12, 2019

(54) METHOD AND SYSTEM OF ADAPTIVE REGULATING FOR INDOOR NETWORK

(71) Applicant: HUIZHOU TCL MOBILE COMMUNICATION CO., LTD., Huizhou, Guangdong (CN)

(72) Inventor: Yanbo Tang, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

(21) Appl. No.: 15/578,038

(22) PCT Filed: Dec. 26, 2016

(86) PCT No.: PCT/CN2016/112030
§ 371 (c)(1),
(2) Date: Nov. 29, 2017

(87) PCT Pub. No.: WO2017/215232
PCT Pub. Date: Dec. 21, 2017

(65) Prior Publication Data
US 2018/0359645 A1    Dec. 13, 2018

(30) Foreign Application Priority Data
Jun. 15, 2016 (CN) .......................... 2016 1 0418292

(51) Int. Cl.
*H04W 40/00* (2009.01)
*H04W 16/10* (2009.01)
(Continued)

(52) U.S. Cl.
CPC ........... *H04W 16/10* (2013.01); *H04J 11/005* (2013.01); *H04J 11/0093* (2013.01); *H04L 5/0032* (2013.01); *H04W 16/00* (2013.01); *H04W 16/20* (2013.01); *H04W 24/02* (2013.01); *H04W 28/16* (2013.01); *H04W 48/20* (2013.01); *H04W 72/04* (2013.01)

(58) Field of Classification Search
CPC ..... H04W 16/10; H04W 48/20; H04W 28/16; H04W 24/02; H04W 72/04; H04W 16/20; H04L 5/0032
See application file for complete search history.

(56) References Cited

U.S. PATENT DOCUMENTS

2006/0140217 A1* 6/2006 Jung .................. H04L 27/2601
                                                                370/468
2010/0093363 A1* 4/2010 Malladi ................ H04B 17/345
                                                                455/452.2
(Continued)

FOREIGN PATENT DOCUMENTS

CN           102474743 A    5/2012
CN           104734830 A    6/2015
(Continued)

*Primary Examiner* — Khoi H Tran
*Assistant Examiner* — B M M Hannan

(57) ABSTRACT

The present disclosure publishes a method and a system of adaptive regulating for indoor network coverage. The method includes detecting the neighboring cells of every cell, obtaining a list of the neighboring cells, and sending a list of the neighboring cells to a network managing center, the network managing center configured to generate an correlating information among the cells; dividing a first bandwidth into a plurality of sub-bandwidths and obtaining a minimum number of the sub-bandwidth according to the correlating information among the cells; assigning the corresponding sub-bandwidths to each of the cells.

20 Claims, 3 Drawing Sheets

(51) Int. Cl.
*H04W 16/20* (2009.01)
*H04W 72/04* (2009.01)
*H04L 5/00* (2006.01)
*H04W 24/02* (2009.01)
*H04W 28/16* (2009.01)
*H04W 48/20* (2009.01)
*H04J 11/00* (2006.01)
*H04W 16/00* (2009.01)

(56) References Cited

U.S. PATENT DOCUMENTS

| | | | | |
|---|---|---|---|---|
| 2012/0093105 | A1* | 4/2012 | Park | H04L 5/00 |
| | | | | 370/329 |
| 2012/0236776 | A1* | 9/2012 | Zhang | H04W 48/12 |
| | | | | 370/312 |
| 2012/0307697 | A1* | 12/2012 | Mukhopadhyay | H04W 24/02 |
| | | | | 370/311 |
| 2013/0021999 | A1* | 1/2013 | Jiang | H04L 5/006 |
| | | | | 370/329 |
| 2013/0196676 | A1* | 8/2013 | Koudouridis | H04W 72/04 |
| | | | | 455/452.1 |
| 2015/0131576 | A1* | 5/2015 | Seo | H04L 5/0064 |
| | | | | 370/329 |
| 2015/0326282 | A1 | 11/2015 | Futaki | |
| 2016/0006529 | A1* | 1/2016 | Yi | H04J 11/0056 |
| | | | | 370/329 |

FOREIGN PATENT DOCUMENTS

| | | | |
|---|---|---|---|
| CN | 104902484 | A | 9/2015 |
| CN | 106102076 | A | 11/2016 |
| EP | 1662826 | A1 | 5/2006 |

\* cited by examiner

METHOD AND SYSTEM OF ADAPTIVE REGULATING FOR INDOOR NETWORK

FIELD OF THE INVENTION

This disclosure relates to the field of communication, and in particular to a method and a system of adaptive regulating for indoor network coverage.

BACKGROUND OF THE INVENTION

In past decades, the flow of mobile data has multiplied, which has made cellular networks require higher capacity and provide broader coverage. Satisfying indoor usage is extremely important since 70% of data usage is used indoors. However, because serious coverage losses happen when going from outdoors to indoors, using networks provided by appliances, like a conventional macro cell to indoor coverage, will cause obvious problems. Nowadays, there are plenty of solutions for indoor coverage, like distributed antenna systems (DAS), which use cells and fibers. The cells include micro cell technologies, micro cells, and family base stations consisting of e-utran nodes B (also known as evolved node B, eNBs), which are low-cost and use low power. The DAS based on fibers consist of concentrated baseband units (BBUs) and distracted remote radio heads (RRHs). They are connected through fibers, and baseband signals (I/O data) are transmitted between them.

High density network topology is compulsory, no matter eNBs or RRHs is used, in order to ensure indoor coverage and the high capacity. However, base stations of the neighboring cell base stations or RRHs extremely limit and interfere with network performance. Therefore, efficient interference negotiation becomes necessary within the areas which are mutually covered by the neighboring cell base stations and RRHs. The "cell" in the following contexts means areas covered by eNBs or RRHs. Typical technologies of inter-cell interference coordination (ICIC) are fractional frequency reuse (FFR) and soft frequency reuse (SFR). Both methods distinguish the cells into central bands and edge bands. The central band is used as a reuse mode by users in the central zones. The edge band is divided into several sub-bandwidths which are viewed as higher reuse modes utilized in reuse for users in edge zones. In SFR techniques, the entire bandwidth is divided into several sub-bandwidths where one of the sub-bandwidths is assigned to users in edge zones, and other bandwidths are used by users with lower power in the central zones. There are also plenty of developed ICIC techniques, like reversed link inter-cell inference proposed by SHANGHAI BELL. The purpose of this technique is to increase the reuse modes of the frequency resources. This concept assigns different reserved sub-bandwidths to neighboring cells in order to replace an available sub-bandwidth. The reserved sub-bandwidths are usage-limited, but available for usage, for the cells in present services.

In general, Macro Cells are arranged in hexagons in open outdoor areas. For the arrangement of the cells shown in FIG. 1, preferable frequency scheduling for the ICIC utilizes edge bands in a reuse mode called 3 and 1/3, which can be easily completed manually. For indoor coverage, the complex and various structures and materials of buildings results in an irregular arrangement of cells. The number of cells and key interference are varied. Please refer to FIG. 2, which illustrates an example of an arrangement of a student flat having two floors. Cell 7 only has one neighboring cell, while cell 5 has five neighboring cells. Therefore, the outdoor frequency 1/3 arrangement mode cannot be directly utilized. In addition, the manual scheming frequency method is nearly impossible to achieve because the number and disposed location of the cell base stations or RRHs are unpredictable.

SUMMARY OF THE INVENTION

Regarding the abovementioned drawbacks of present technologies, the object of present disclosure is to provide a method and a system of adaptive regulating for indoor network coverage for the purpose of decreasing interference among the cells.

The technical solutions of present disclosure are as follows:

An adaptive regulating method for indoor network coverage, comprising:

detecting a target cell using receivers of all cells, where the receivers are embedded user terminal receivers;

recognizing the target cell as a neighboring cell and adding the target cell into a list of neighboring cells in response to detecting that a receiving power of a reference signal of the receivers within the target cell is greater than a threshold of a predetermined power;

sending the list of neighboring cells to a network managing center, the network managing center configured to generate a correlating information among the cells according to a correlation array after receiving the list of neighboring cells;

dividing a first bandwidth into a plurality of sub-bandwidths according to the correlating information among the cells, and obtaining a minimum number of the sub-bandwidth;

allocating a corresponding sub-bandwidth to each of the cells according to the minimum number of the sub-bandwidth, wherein the sub-bandwidth comprises a starting value and an ending value, and the starting value and the ending value are calculated as follows:

$$\begin{cases} S_i = (i-1)\left\lfloor \dfrac{N_{PRB}}{K} \right\rfloor \\ E_i = i\left\lfloor \dfrac{N_{PRB}}{K} \right\rfloor \end{cases},$$

where K represents a total number of the sub-bandwidths, Si represents the starting value of the sub-bandwidth i, Ei represents the ending value of the sub-bandwidth I, NPRB represents an available frequency of physical resource blocks (PRBs), and $\lfloor x \rfloor$ represents the maximum integer which does not exceed x.

Preferably, the dividing the first bandwidth into the plurality of sub-bandwidths according to the correlating information among the cells, and obtaining the minimum number of the sub-bandwidths, comprises:

establishing a relational chart of the neighboring cells according to the correlation array;

adding all the cells on the relational chart of the neighboring cells into an unassigned group;

choosing a cell from the cells in the unassigned group randomly at a first time, and assigning a sub-bandwidth sequence number of a first sub-bandwidth to the cell chosen at the first time, and adding the cell chosen at the first time into the group of the first sub-bandwidth corresponding to the sub-bandwidth sequence number of the first sub-bandwidth;

choosing a cell from the cells in the unassigned group randomly at a second time, determining whether the cell chosen at the second time is adjacent to one of the cells in the group of the first sub-bandwidth; keeping the cell chosen at the second time in the unassigned group if the cell chosen at the second time is adjacent to one of the cells in the group of the first sub-bandwidth; assigning another sub-bandwidth sequence number of the first sub-bandwidth number of the first sub-bandwidth to the cell chosen at the second time and adding the cell chosen at the second time into the group of the first sub-bandwidth corresponding to the assigned number of the first sub-bandwidth at the second time, if the cell chosen at the second time is not adjacent to one of the cells in the group of the first sub-bandwidth, until all the cells in the unassigned group are chosen;

choosing a cell from the cells in the unassigned group randomly at a third time, and assigning a sub-bandwidth sequence number of a second sub-bandwidth to the cell chosen randomly at the third time, and adding the cell chosen randomly at the third time into the group of the second sub-bandwidth corresponding to the sub-bandwidth sequence number of the second sub-bandwidth, re-choosing a cell from the cells in the unassigned group randomly and determine whether the re-chosen cell is adjacent to one of the cells in the group of the second sub bandwidth, keeping the re-chosen cell in the unassigned group if the re-chosen cell is adjacent to one of the cells in the group of the second sub-bandwidth; if the re-chosen cell is not adjacent to one of the cells in the group of the second sub bandwidth, assigning another sub-bandwidth sequence number of the second sub-bandwidth number of the second sub-bandwidth to the re-chosen cell and adding the re-chosen cell into the group of the second sub-bandwidth corresponding to the assigned number of the second sub-bandwidth, until all the cells in the unassigned group are assigned to the corresponding sub-bandwidth for the purpose of obtaining the minimum number of sub-bandwidth.

An adaptive regulating method for indoor network coverage, comprising steps:

A. detecting neighboring cells of each of cells, obtaining a list of the neighboring cells, and sending the list of the neighboring cells to a network managing center, the network managing center configured to generate a correlating information among the cells;

B. dividing a first bandwidth into a plurality of sub-bandwidths and obtaining the minimum number of the sub-bandwidths according to the correlating information among the cells;

C. allocating the corresponding sub-bandwidths to each of the cells according to the minimum number of the sub-bandwidth.

Preferably, the step A specifically comprises:

A1. detecting a target cell using receivers of each of the cells, where the receivers are embedded user terminal receivers;

A2. recognizing the target cell as a neighboring cell and adding the neighboring cell into the list of neighboring cells in response to detecting that a receiving power of a reference signal of the target cell is greater than a threshold of a predetermined power; and A3. sending the list of neighboring cells to the network managing center configured to indicate the correlating information according to a correlation array after receiving the list of neighboring cells.

Preferably, the step A2 further comprises:

scanning the neighboring cell and obtaining a scanning result; and updating the list of the neighboring cells according to the scanning result.

Preferably, after updating the list of the neighboring cells further comprises: notifying the network managing center to update the correlation array.

Preferably, the step B specifically comprises:

B1. establishing a relational chart of neighboring cells according to the correlation array;

B2. adding all cells on the relational chart of the neighboring cells into an unassigned group;

B3. choosing a cell from the cells in the unassigned group randomly at a first time, and assigning a sub-bandwidth sequence number of a first sub-bandwidth to the cell chosen at the first time, and adding the cell chosen at the first time into the group of the first sub-bandwidth corresponding to the sub-bandwidth sequence number of the first sub-bandwidth;

B4. choosing a cell from the cells in the unassigned group randomly at a second time, determining whether the cell chosen at the second time is adjacent to one of the cells in the group of the first sub-bandwidth; keeping the cell chosen at the second time in the unassigned group if the cell chosen at the second time is adjacent to one of the cells in the group of the first sub-bandwidth; if the cell chosen at the second time is not adjacent to one of the cells in the group of the first sub-bandwidth, assigning another sub-bandwidth sequence number of the first sub-bandwidth to the cell chosen at the second time and adding the cell chosen at the second time into the group of the first sub-bandwidth corresponding to the assigned sub-bandwidth sequence number of the first sub-bandwidth at the second time, until all the cells in the unassigned group are chosen;

B5. choosing a cell from the cells in the unassigned group randomly at a third time, and assigning a sub-bandwidth sequence number of a second sub-bandwidth to the cell randomly chosen at the third time, and adding the cell randomly chosen at the third time into the group of the second sub-bandwidth corresponding to the sub-bandwidth sequence number of the second sub-bandwidth, and re-choosing a cell from the cells in the unassigned group randomly and determining whether the re-chosen is adjacent to one of the cells in the group of the second sub-bandwidth, keeping the re-chosen cell in the unassigned group if the re-chosen cell is adjacent to one of the cells in the group of the second sub-bandwidth; if the re-chosen cell is not adjacent to one of the cells in the group of the second sub bandwidth, assigning another sub-bandwidth sequence number of the second sub-bandwidth to the re-chosen cell and adding the re-chosen cell into the group of the second sub-bandwidth corresponding to the assigned sub-bandwidth sequence number of the second sub-bandwidth until all the cells in the unassigned group are assigned to the corresponding sub-bandwidth groups for the purpose of obtaining the minimum number of sub-bandwidths.

Preferably, the step B5 further comprises:

obtaining a maximum of the sub-bandwidth sequence numbers corresponding to the groups of the sub-bandwidths; and setting the maximum sub-bandwidth sequence number as the minimum number of the sub-bandwidths.

Preferably, the sub-bandwidth comprises a starting value and an ending value, and the starting value and the ending value of the sub-bandwidth in the step C are calculated as follows:

$$\begin{cases} S_i = (i-1)\left\lfloor \dfrac{N_{PRB}}{K} \right\rfloor \\ E_i = i\left\lfloor \dfrac{N_{PRB}}{K} \right\rfloor \end{cases}$$

wherein K represents a total number of the sub-bandwidths, Si represents a starting value of a sub-bandwidth i, Ei represents an ending value of the sub-bandwidth i, NPRB represents an available frequency resource of physical resource blocks (PRBs), and $\lfloor x \rfloor$ represents a maximum integer which does not exceed x.

Preferably, step C further comprises:

checking the groups of the sub-bandwidths assigned for neighboring cells in the network managing center;

assigning a sub-bandwidth, as the first sub-bandwidth, to the cell corresponding to the sub-bandwidth if the number of the groups of sub-bandwidths of the neighboring cells is equal to the total number of the sub-bandwidths;

assigning a sub-bandwidth, as the second sub-bandwidth, to the cell corresponding to the sub-bandwidth if the number of the groups of sub-bandwidths of the neighboring cells is fewer than the total number of the sub-bandwidths.

the step C further comprises:

sending a negotiating request among the cells to the network managing center if a carrying-load of an edge zone of a cell exceeds a carrying threshold; and assigning the sub-bandwidth to the cell and to the neighboring cells of the cell through the network managing center.

An adaptive regulating system for indoor network coverage, comprising:

a detecting module configured to detect the neighboring cells of each of the cells, obtain a list of neighboring cells, and send the list of neighboring cells to a network managing center configured to generate a correlating information among the cells;

a dividing module configured to divide a first bandwidth into a plurality of sub-bandwidths according to the correlating information among the cells, and obtain a minimum number of the sub-bandwidth;

an allocating module configured to allocate a corresponding sub-bandwidth to each of the cells according to the minimum number of the sub-bandwidth.

Preferably, the detecting module further comprises:

a detecting unit configured to detect a target cell using receivers of all cells, wherein the receivers are embedded user terminal receivers;

a determining unit configured to recognize the target cell as a neighboring cell and add the target cell into a list of neighboring cells in response to detecting that a receiving power of a reference signal of the receivers within the target cell is greater than the threshold of a predetermined power;

a list-sending unit configured to send the list of neighboring cells to a network managing center, the network managing center configured to indicate a correlating information according to a correlation array after receiving the list of neighboring cells.

Preferably, the detecting module further comprises:

a scanning unit configured to scan the neighboring cell and obtain a scanning result; and an updating unit configured to update the list of neighboring cells.

Preferably, the detecting module further comprises:

a notifying unit configured to notify the network managing center to update the correlation array.

Preferably, the dividing module further comprises:

a relational chart of the neighboring cells establishing unit configured to establish a relational chart of the neighboring cells;

an adding unit configured to add all the cells on the relational chart of the neighboring cells into an unassigned group;

a first-time choosing unit configured to choose a cell from the cells in the unassigned group randomly at a first time, and assigning a sub-bandwidth sequence number of a first sub-bandwidth to the cell chosen at the first time, and add the cell chosen at the first time into the group of the first sub-bandwidth corresponding to the sub-bandwidth sequence number of the first sub-bandwidth;

a second-time choosing unit configured to choose a cell from the cells in the unassigned group randomly at a second time, and comparing the cell chosen at the second time with all the cells in the group of the first sub-bandwidth in order to determine whether the cell chosen at the second time is adjacent to one of the cells in the group of the first sub-bandwidth, keep the cell chosen at the second time in the unassigned group if the cell chosen at the second time is adjacent to one of the cells in the group of the first sub-bandwidth; if the cell chosen at the second time is not adjacent to one of the cells in the group of the first sub-bandwidth, assigning another sub-bandwidth sequence number of the first sub-bandwidth to the cell chosen at the second time adding the cell chosen at the second time into the group of the first sub-bandwidth corresponding to the assigned sub-bandwidth sequence number of the first sub-bandwidth at the second time, and completing choosing all the cells of unassigned group in turns; and an iterative unit configured to re-choose a cell from the cells in the unassigned group randomly, assign a sub-bandwidth sequence number of the second sub-bandwidth to the randomly re-chosen cell, and add the re-chosen cell to the group of the second sub-bandwidths corresponding to the sub-bandwidth sequence number of the second sub-bandwidth, assign all the cells in the unassigned group to the corresponding group of the sub-bandwidths in turns on the basis of the method taught in step B4 for the purpose of obtaining the minimum number of sub-bandwidth.

Preferably, the iterative unit is mainly configured to:

obtaining a maximum of the sub-bandwidth sequence numbers corresponding to the groups of the sub-bandwidths; and setting the maximum sub-bandwidth sequence number as the minimum number of the sub-bandwidths.

Preferably, the sub-bandwidth comprises a starting value and an ending value, and the starting value and the ending value of the sub-bandwidth in the allocating module are calculated as follows:

$$\begin{cases} S_i = (i-1)\left\lfloor \dfrac{N_{PRB}}{K} \right\rfloor \\ E_i = i\left\lfloor \dfrac{N_{PRB}}{K} \right\rfloor \end{cases}$$

wherein K represents a total number of the sub-bandwidths, Si represents the starting value of the sub-bandwidth i, Ei represents the ending value of sub-bandwidth i, NPRB represents the available frequency of physical resource blocks (PRBs), and $\lfloor x \rfloor$ represents the maximum integer which does not exceed x.

Preferably, the allocating module comprises:

a checking unit configured to check the group of the sub-bandwidths assigned to the neighboring cells in the network managing center;

a first assigning unit configured to assign the sub-bandwidth, as the first sub-bandwidth, to the cells corresponding to the sub-bandwidth if the number of the group of sub-bandwidth of the neighboring cells is equal to the total number of the sub-bandwidth;

a second assigning unit configured to assign the sub-bandwidth, as the second sub-bandwidth, to the cells corresponding to the sub-bandwidth if the number of the group of sub-bandwidth of the neighboring cells is less than the total number of the sub-bandwidth.

Preferably, the allocating module comprises:

a sending unit configured to send a negotiating request among the cells to the network managing center if a carrying-load of an edge zone of a cell exceeds the carrying threshold; and an allocating unit configured to assign the sub-bandwidths to the cells and to the neighboring cells of the cells through the network managing center.

The present disclosure provides an adaptive regulating method is for indoor network coverage, and also suitable for the irregular arrangements and unpredictable wireless broadcast for indoor network coverage. The method provided by present disclosure can decrease interference among the cells.

DETAILED DESCRIPTION OF THE PREFERRED EMBODIMENTS

The present disclosure provides a method and a system of adaptive regulating for indoor network coverage. The present disclosure will be introduced in detail hereinafter to make the objects, technical solutions, and effects clearer and more certain. It should be understood that the examples here are used to explain the present disclosure, not used to limit the present disclosure.

Herein, the phrase "a corresponding P of each of Qs" refers to a non-sharing correspondence such as when Q is Q1, the corresponding P is P1, when Q is Q2, the corresponding P is P2. Similarly, the phrase "corresponding Ps of Qs" refers also to the non-sharing correspondence such as when Qs are Q1 and Q2, the corresponding Ps are P1 and P2, respectively. By contrast, the phrase "a P of each of Qs" refers to one of the following correspondences: the non-sharing correspondence mentioned with respect to the phrase "a corresponding P of each of Qs" and a sharing correspondence such as when Q is Q1, the corresponding P is P1, and when Q is Q2, the corresponding P is also P1. Similarly, the phrase "at least one P of Qs" refers to one of the following correspondences: the non-sharing correspondence as mentioned with respect to the phrase "corresponding Ps of Qs" and the sharing correspondence such as when Qs are Q1 and Q2, the at least one P is P1.

Figure 3:
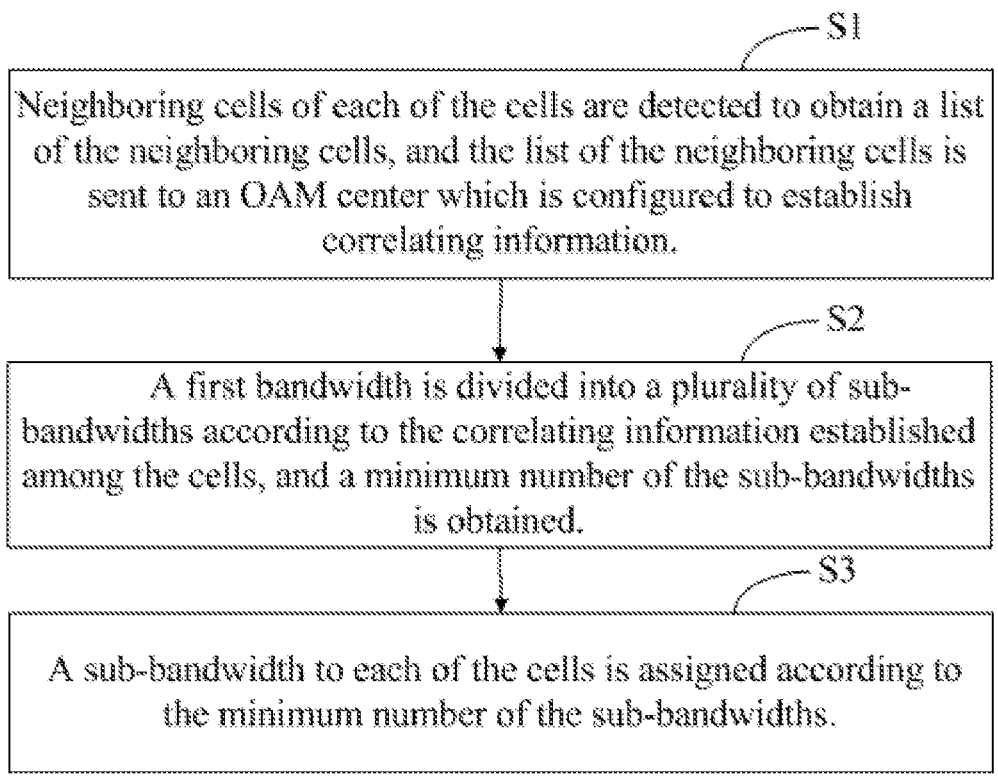
FIG. 3 is a flowchart of the present disclosure provided with an adaptive regulating method for indoor network coverage.

Please refer to FIG. 3, an adaptive regulating method for indoor network coverage comprises steps:

S1. Detecting neighboring cells of each of the cells, obtaining a list of the neighboring cells and sending the list of the neighboring cells to an OAM center which is configured to establish correlating information;

S2. Dividing a first bandwidth into a plurality of sub-bandwidths according to the correlating information established among the cells, where the first bandwidth is an available bandwidth;

S3. Assigning a sub-bandwidth to each of the cells.

The present disclosure mainly includes some aspects as follows:

1. The present disclosure establishes a list of neighboring cells for each of the cells. The present disclosure scans the wireless environments by eNB or RRH, more specifically, scans when the disposing process of eNB or the RRH has just started and when the carrying-load of data is low. Once the list of the neighboring cells is established or updated, the system will send the list of neighboring cells to the network managing center (i.e., OAM, Operating, Administering, and Maintaining). Then, the correlating information among the cells is established.

2. Dividing a first bandwidth (determined on the basis of ICIC technology) into a plurality of sub-bandwidths according to the correlating information established among the cells, where the first bandwidth is an available bandwidth. This step ensures the minimum number of the sub-bandwidths and the same sub-bandwidth will not be allocated to neighboring cells.

Monitor the carrying-load of an edge zone of each cell during the execution. If the carrying-load of the edge zone exceeds the carrying-load threshold, a request of interference negotiation, i.e., an ICIC request, is sent to the OAM center. The OAM center will send a notification of an assigned sub-bandwidth after receiving the ICIC request to the system which sent the request. The system makes the corresponding cell reuse the entire bandwidth before receiving the notification. The present disclosure is a half-static scheme which eliminates interference among the cells and ensures the highest usage of the frequency resource at the same time.

The conventional scheme of inter cell interference coordination (ICIC) is based on the hypothesis that each of the cells has the same number of neighboring cells, i.e., the situations that the cells are composed in a normal hexagon. For those kinds of normal arrangements of cells, the entire network applies the same frequency assigning factors, like 1/3, which are normally easy to implement. In addition, the present frequency scheming are implemented manually. The reasons that the scheming is improper for indoor network coverage are as follows:

1. For indoor network coverage, the arrangements of the cells are irregular due to the complex and closed indoor environment. Therefore, the number of the neighboring cells and the number of interferences will differ from different cells. Thus, applying the same frequency assigning factor is not suitable for an indoor environment. In addition, there has no solution to calculate the different modes of frequency classifications for different arrangement of cells.

2. The designs and building methods are varied for each of the buildings. For example, office buildings have plenty of small rooms with thin walls in between. Hotels have huge rooms and halls with passages. In addition, different shapes and materials will change the indoor wireless transmission as well. To conclude, indoor predictions become extremely difficult. Further researching and measuring are requested if the frequency is arranged manually, which is costly in both time and money.

The adaptive regulating method for indoor network coverage provided by the present disclosure can solve the problems of indoor coverage ICIC. The present disclosure includes three steps as follows: detecting neighboring cells, obtaining the minimum number of sub-bandwidths needed, and allocating the sub-bandwidths.

The step S1 for detecting the neighboring cells mainly comprises:

S11. Detect a target cell with the embedded user equipment (UE) receivers;

S12. If it is detected that a receiving power of a reference signal of the target cell is greater than the threshold of a predetermined power, then the target cell is recognized as a neighboring cell and added into a list of neighboring cells;

S13. Send the list of neighboring cells to the OAM center, to make the OAM center generate a correlation array based on which the correlation information among cells is expressed after receiving the list of neighboring cells.

To complete the detecting process, each of the eNBs or RRHs has a receiver which is an embedded user equipment receiver, i.e., an embedded UE receiver. While arranging the eNBs or RRHs, the UE receivers are supplied with power to detecting neighboring cells before arranging is started. The detecting methods are aiming to measure the reference signal received power (RSRP) of cell-specific reference signals (CRS) or channel state information reference signals (SCI-RS). More specifically, detecting methods can be chosen on the basis of whether the eNBs or RRHs belong to the same physical cells or not. The present disclosure sets a threshold for the power. If the RSRP of another cell is greater than the threshold power of the cell when scanning, then the other cell is the neighboring cell of the scanning cell.

Figure 1:
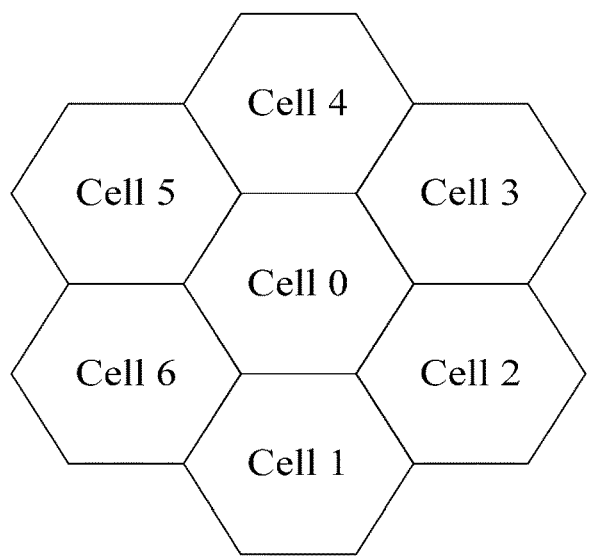
FIG. 1 is an illustration of an arrangement of cells outdoors under present technology.
Figure 2:
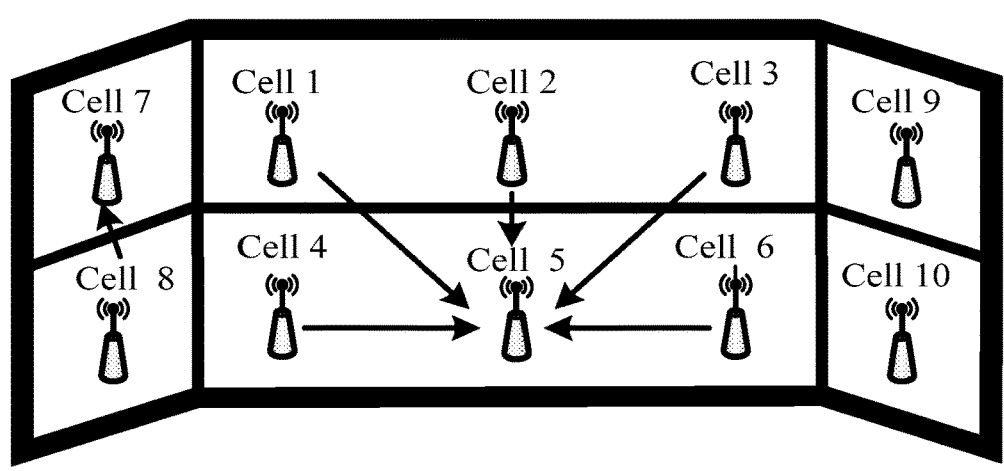
FIG. 2 is an illustration of an arrangement of cells indoors under present technology.

Once the neighboring cells are detected, a list of neighboring cells corresponding to the identifications IDs of eNBs or RRHs is sent to the OAM center, where the list of neighboring cell comprises the information of neighboring cells. After receiving the reports from eNBs or RRHs, the OAM center establishes the correlating information among neighboring cells. Take the situation in FIG. 2 for example, the established relationships are indicated by the array C as follows, where 1 represents that two cells are neighboring cells, 0 represents that two cells are independent (not neighboring).

Cell ID 1 2 3 4 5 6 7 8 9 10

$$C = \begin{matrix} 1 \\ 2 \\ 3 \\ 4 \\ 5 \\ 6 \\ 7 \\ 8 \\ 9 \\ 10 \end{matrix} \begin{bmatrix} 0 & 1 & 0 & 1 & 1 & 0 & 0 & 0 & 0 & 0 \\ 1 & 0 & 1 & 0 & 1 & 0 & 0 & 0 & 0 & 0 \\ 0 & 1 & 0 & 0 & 1 & 1 & 0 & 0 & 0 & 0 \\ 1 & 0 & 0 & 0 & 1 & 0 & 0 & 0 & 0 & 0 \\ 1 & 1 & 1 & 1 & 0 & 1 & 0 & 0 & 0 & 0 \\ 0 & 0 & 1 & 0 & 1 & 0 & 0 & 0 & 0 & 0 \\ 0 & 0 & 0 & 0 & 0 & 0 & 0 & 1 & 0 & 0 \\ 0 & 0 & 0 & 0 & 0 & 0 & 1 & 0 & 0 & 0 \\ 0 & 0 & 0 & 0 & 0 & 0 & 0 & 0 & 0 & 1 \\ 0 & 0 & 0 & 0 & 0 & 0 & 0 & 0 & 1 & 0 \end{bmatrix} \quad (1)$$

Because the relationships among the neighboring cells may be changed with the change of the buildings, the embedded UE receivers work when the eNB and RRH work. When the carry-load is low, like during the night for office buildings or during the daytime for residences, the "nearly-empty" physical resource blocks (PRBs) can be set. Only CRS and CSI-RS can be transmitted through the PRBs while the physical downlink shared channel (PDSCH) cannot. The scanning of neighboring cells can be completed in those PRBs. If the scanning result differs from the established list of the neighboring cells, the list of the neighboring cells is updated and the OAM center is notified to update the correlation array correspondingly.

The step S2 to obtain the minimum number of needed sub-bandwidths comprises:

S21. Establishing a relational chart of neighboring cells according to the correlation array;

S22. Adding all the cells in the relational chart of the neighboring cells to an unassigned group;

S23. Choosing a cell from the cells in the unassigned group randomly at a first time, and assigning a sub-bandwidth sequence number of a first sub-bandwidth to the cell chosen at the first time, and adding the cell chosen at the first time into the group of the first sub-bandwidth corresponding to the sub-bandwidth sequence number of the first sub-bandwidth;

S24. Choosing a cell from cells in the unassigned group randomly at a second time, determining whether the cell chosen at the second time is adjacent to one of cells in the group of the first sub-bandwidth; keeping the cell chosen at the second time in the unassigned group if the cell chosen at the second time is adjacent to one of the cells in the group of the first sub-bandwidth; if the cell chosen at the second time is not adjacent to one of the cells in the group of the first sub-bandwidth, assigning another sub-bandwidth sequence number of the first sub-bandwidth to the cell chosen at the second time and adding the cell chosen at the second time into the group of the first sub-bandwidth corresponding to the assigned sub-bandwidth sequence number of the first sub-bandwidth at the second time, and so on until all the cells in the unassigned group are chosen;

S25. Choosing a cell from the cells in the unassigned group randomly at a third time, and assigning a sub-bandwidth sequence number of a second sub-bandwidth to the cell randomly chosen at the third time, and adding the cell randomly chosen at the third time into the group of the second sub-bandwidth corresponding to the sub-bandwidth sequence number of the second sub-bandwidth, and determining based on a method of the step S24 and so on until all the cells in the unassigned group are assigned to sub-bandwidth groups. After all the cells in the unassigned group have been assigned, a maximum sub-bandwidth sequence number obtained is the minimum number of sub-bandwidths.

Dividing the first bandwidth (base on the utilized ICIC techniques, like FFR or SFR) according to the correlation array, where the first bandwidth is an available bandwidth. The present disclosure has to ensure that two neighboring cells will not be assigned to the same sub-bandwidth, and ensure the minimum number of the sub-bandwidths obtained from the relation chart of the neighboring cells.

Figure 4:
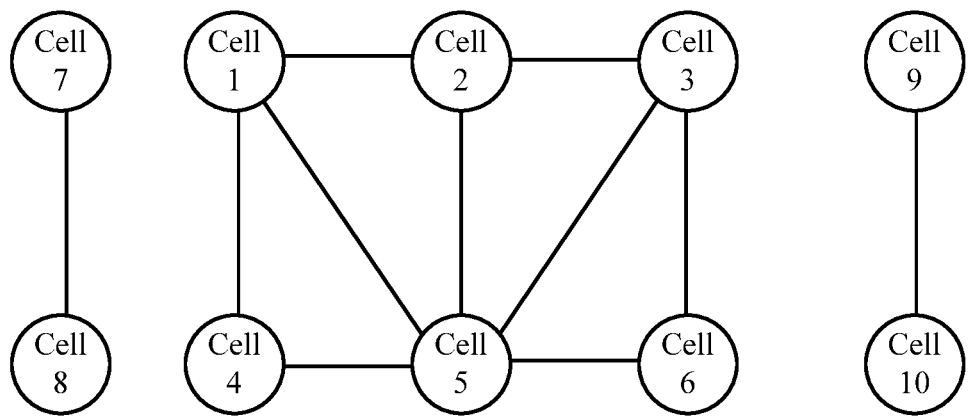
FIG. 4 is an example of a relational chart of neighboring cells of the present disclosure.

In the present disclosure, first, a relational chart of the neighboring cells is established according to the correlation array. If the factor in the array is 1, then a line is drawn between the two corresponding cells (link two cells together). Therefore, only the processes dealing with the upper triangular factors of the relation are required since the relation array is symmetrical. Assuming that the number of the cells is N, then the relational chart of the neighboring cells can be established by an algorithm as shown in FIG. 4. A specific example illustrating the relational chart of neighboring cells is shown in FIG. 4 with respect to the correlation array shown by the equation (1) and the situation shown in FIG. 2.

The steps to complete the calculations for the minimum number of the sub-bandwidths are as follows: first, adding all the cells on the relational chart of the neighboring cells into an unassigned group. The present disclosure chooses a cell as a first assigned cell randomly and assigns 1 as a sub-bandwidth sequence number according to the relational chart of the neighboring cells. Add the cell chosen first into group 1 and remove this cell from the unassigned group. Then, choosing a second cell randomly from the unassigned group. Determining whether the second chosen cell connects to the cells of group 1 or not. If not, assign 1 as the sub-bandwidth sequence number to the second chosen cell, and add it into the group 1 (sub-bandwidth). If the second chosen cell connects to any one of the cells in the group 1, keep this cell in the unassigned group. Continuously executing the abovementioned processes until no cell, which is not neighboring with any one of the cells in the group 1, is kept in the unassigned group. In the following iterative processes, repeat the abovementioned processes where the sub-bandwidth sequence number being assigned is 2, and the corresponding group is 2. After assigning each of the cells into the sub-bandwidth group, the maximum sub-bandwidth sequence number represents the minimum number of the sub-bandwidths. For example, the final assigned maximum sub-bandwidth sequence number is 7, therefore, the minimum number of the sub-bandwidths is 7.

The substantial algorithms are as follows:

for i=1 to N do
for j=1 to N do
if Cij=1 then
Draw an edge between cell i and cell j (draw a line between cell i and cell j)
end if
end for
end for Next, analyze the step S3 for assigning the sub-bandwidth.

After the step S2, the first bandwidth is divided into the plurality of sub-bandwidths. Assume that the maximum sub-bandwidth sequence number is K (also the total number of the sub-bandwidths), then, the starting value Si and the ending value Ei of the sub-bandwidth i are indicated as follows:

$$\begin{cases} S_i = (i-1) \lfloor \frac{N_{PRB}}{K} \rfloor \\ E_i = i \lfloor \frac{N_{PRB}}{K} \rfloor \end{cases}$$

Where NPRB represents the available frequency resource of PRBs (in the aspect of the number of PRBs), and $\lfloor x \rfloor$ represents the maximum integer which does not exceed x.

The abovementioned function provides the method for the entire network to plan the bandwidth according to the required number of sub-bandwidths. A separable sub-bandwidth could be assigned to a cell having plenty of neighboring cells, like the cell 5 in FIG. 2. But for those cells which have few or no neighboring cells, assigning a sub-bandwidth lacks a benefit for the aspect of maximum efficiency. In such a situation, preserving a second sub-bandwidth so that a first sub-bandwidth is replaced is more efficient, where the first sub-bandwidth is an available sub-bandwidth. For this object, check the groups of the sub-bandwidths assigned for neighboring cells in the OAM center. If the number of the sub-bandwidths of one group of neighboring cells is equal to the total number of the sub-bandwidths, assign the sub-bandwidth, as the first sub-bandwidth, to the cell assigned the group of the sub-bandwidth. If the number of the sub-bandwidths of one group of neighboring cells is fewer than the total number of the sub-bandwidths, assign this sub-bandwidth, as the second sub-bandwidth, to the cell assigned the group of the sub-bandwidth.

The performance will be affected by using ICIC techniques to decrease or eliminate the ICIC of users in edge zones of cells, in other words, if there are UEs (User Equipment) in the common space among the neighboring cells, then the utilization of the ICIC technique will earn beneficial effect. Hence, the environments of the edge zones of the cells have to be checked before utilizing the ICIC techniques. Monitor the carrying-load of an edge zone of each of the cells for this purpose, which can be practiced by calculating the number of the users in the edge zone of the cell or the usage rate of the PRBs in the edge zone of the cell. The users in the edge zone of the cell can be checked by various methods, mainly according to the performance of the UEs. These methods include measuring the signal-to-interference-plus-noise ratio (SINR) of upper link of every cell in the service, concerning the SINR responding report of down-link, or concerning the responding report relating to the distinguish of RSRP, where the distinguish of RSRP represents the distinguish between the cells in service and the neighboring cells. If the carrying-load of the edge zone of one of the cells exceeds the predetermined threshold (carrying-load threshold), an ICIC request is sent to the OAM center. Once the ICIC request is received by the OAM center, the assigned sub-bandwidths are fed back to the cell requested and its neighboring cells through X2 signaling. The X2 signaling includes a recognizing sign which indicates the assigned sub-bandwidth is available or preserved, mainly according to the starting PRB and the ending PRB. To ensure the maximum usage of the frequency resource, each of the cells will reuse the entire bandwidth until receiving the notification of the assigned sub-bandwidth.

Figure 5:
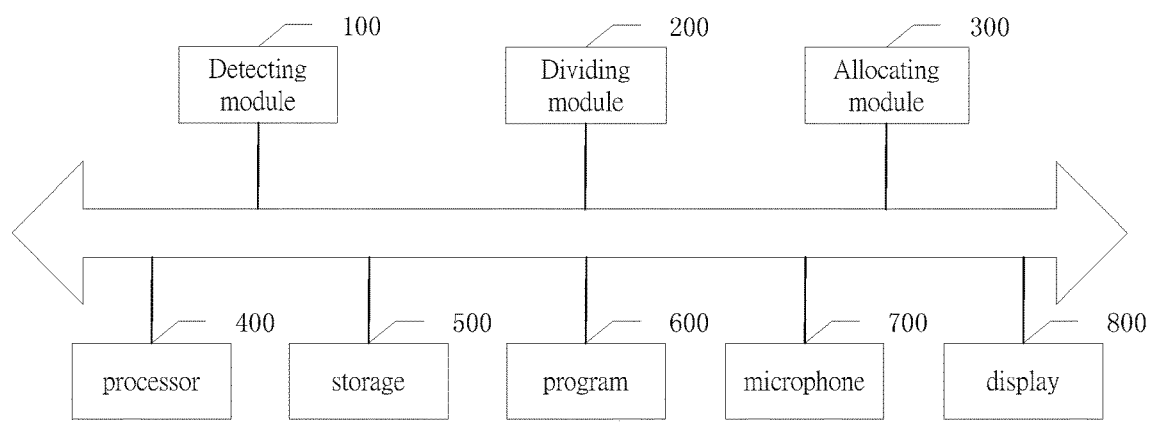
FIG. 5 is a structural diagram of the present disclosure provided with an adaptive regulating system for indoor network coverage.

The present disclosure further provides an adaptive regulating system for indoor coverage as shown in FIG. 5, which comprises:

A detecting module 100, a dividing module 200, an allocating module 300, one or more processors 400 for central processing, one or more storages 500 that can read/write the media of calculators, one or more programs 600 stored in the storages 500, microphone 700, and display 800 etc. It can be understood by people of skill in this art that the structure of the systems shown in FIG. 5 are not a limitation to the system which can have more or less components than the figures, combine some of the components, or be arranged in different way.

In the present disclosure, the processor 400 issues commands and loads one or more programmable codes corresponding to the processes of application programs into the storage 500. The programs 600 stored in storage 500 are executed by processor 400 in order to execute the power controlling methods for the purpose of implementing each of the corresponding performances.

More specifically, the detecting module 100 is configured to detect the neighboring cells of each of the cells, obtain the list of neighboring cells, and send the list to OAM center to make the OAM center establish the correlating information among the cells;

dividing module 200 is configured to divide a first bandwidth into a plurality of sub-bandwidths according to the correlating information among the cells, and obtain a minimum number of the sub-bandwidth;

allocating module 300 is configured to allocate a sub-bandwidth to each of the cells according to the minimum number of the sub-bandwidth.

Moreover, the detecting module 100 specifically comprises:

a detecting unit which is configured to detect a target cell by utilizing receivers of all the cells, wherein the receivers are embedded user terminal receivers;

a determining unit which is configured to recognize the target cell as a neighboring cell and add the target cell into a list of neighboring cells if detecting that a receiving power of a reference signal of the receivers within the target cell is greater than the threshold of a receiving power;

a list-sending unit which is configured to send the list of neighboring cells to a network managing center, the network managing center configured to indicate a correlating information according to an associate array after receiving the list of neighboring cell.

Moreover, the dividing module 200 specifically comprises:

an establishing unit for relational chart of the neighboring cells which is configured to establish a relational chart of the neighboring cells;

an adding unit which is configured to add all the cells on the relational chart of the neighboring cells into an unassigned group;

a first-time choosing unit which is configured to choose a cell of the unassigned group randomly at a first time, and assigning a sub-bandwidth sequence number of a first sub-bandwidth to the cell chosen at the first time, and add the cell chosen at the first time into the group of the first sub-bandwidth corresponding to the sub-bandwidth sequence number of the first sub-bandwidth;

a second-time choosing unit which is configured to choose a cell of the unassigned group randomly at a second time, and determining whether the cell chosen at the second time is adjacent to one of the cells in the group of the first sub-bandwidth; keeping the cell chosen at the second time in the unassigned group if the cell chosen at the second time is adjacent to one of the cells in the group of the first sub-bandwidth; if the cell chosen at the second time is not adjacent to one of the cells in the group of the first sub-bandwidth, assigning another sub-bandwidth sequence number of the first sub-bandwidth to the cell chosen at the second time and adding the cell chosen at the second time into the group of the first sub-bandwidth corresponding to the assigned sub-bandwidth sequence number of the first sub-bandwidth at the second time, until all the cells in the unassigned group are chosen; and an iterative unit which is configured to re-choose a cell from the cells in the unassigned group randomly, assign a sub-bandwidth sequence number of the second sub-bandwidth to the randomly re-chosen cell, and add the re-chosen cell to the group of the second sub-bandwidths corresponding to the assigned sub-bandwidth sequence number of the second sub-bandwidth, assign all the cells of the unassigned group to the groups of the sub-bandwidths in turns on the basis of the method taught in step B4 for the purpose of obtaining the minimum number of sub-bandwidths.

Moreover, the sub-bandwidth comprises a starting value and an ending value, and the starting value and the ending value of the sub-bandwidth in the allocating module 300 are calculated as follows:

$$\begin{cases} S_i = (i-1)\left\lfloor \dfrac{N_{PRB}}{K} \right\rfloor \\ E_i = i\left\lfloor \dfrac{N_{PRB}}{K} \right\rfloor \end{cases}$$

wherein K represents a total sub-bandwidth, Si represents the starting value of the sub-bandwidth i, Ei represents the ending value of sub-bandwidth i, NPRB represents the available frequency of PRBs, and $\lfloor x \rfloor$ represents the maximum integer which does not exceed x.

The technical details of the abovementioned modules are described in above methods and thus will not be repeated again.

It should be understood that the application of the present disclosure should not be limited to the abovementioned examples. For those of ordinary skill in the art, modifications and the variations may be made according to the abovementioned description; all of the modifications and variations should fall into the scope the claims intend to protect.

What is claimed is:

1. An adaptive regulating method for indoor network coverage, comprising:
   A. performing, by each of a plurality of cells, steps of: detecting at least one corresponding neighboring cell of each of the plurality of cells, obtaining a list of the at least one corresponding neighboring cell, and sending the list of the at least one corresponding neighboring cell to a network managing center;
   B. performing, by the network managing center, steps of:
      B1. generating a correlating information among the plurality of cells based on the list of the at least one corresponding neighboring cell of each of the plurality of cells;
      B2. establishing a relational chart of the plurality of cells according to the correlating information;
      B3. adding all cells on the relational chart into an unassigned group;
      B4. randomly choosing a current first cell from the unassigned group, assigning a current sub-bandwidth sequence number to the current first cell, adding the current first cell into a current sub-bandwidth group corresponding to the current sub-bandwidth sequence number, and removing the current first cell from the unassigned group;
      B5. randomly choosing a current second cell from the unassigned group, determining whether the current second cell is adjacent to one of at least one cell in the current sub-bandwidth group, if so, keeping the current second cell in the unassigned group, and if not, assigning the current sub-bandwidth sequence number to the current second cell, adding the current second cell into the current sub-bandwidth group, and removing the current second cell from the unassigned group;
      B6. iteratively performing the step B5 for a next cell different from the current second cell in the unassigned group until all the cells on the relational chart have been processed with respect to the current sub-bandwidth group;

B7. iteratively performing the steps B4, B5 and B6 for a next cell in the unassigned group, a next sub-bandwidth sequence number and a next sub-bandwidth group until all the cells on the relational chart have been assigned sub-bandwidth sequence numbers;

B8. dividing a first bandwidth into a plurality of first sub-bandwidths, wherein a number of the plurality of first sub-bandwidths is equal to a maximum of the sub-bandwidth sequence numbers; and C. performing, by the network managing center, steps of: in response to the plurality of the cells comprising a first cell for which a group of the first cell and the at least one corresponding neighboring cell is assigned second sub-bandwidths having a number of the second sub-bandwidths fewer than the number of the first sub-bandwidths, causing the first cell to use the first bandwidth such that one of the first sub-bandwidths is preserved, and in response to the plurality of the cells further comprising a second cell for which a group of the second cell and the at least one corresponding neighboring cell is assigned third sub-bandwidths having a number of the third sub-bandwidths same as the number of the first sub-bandwidths, causing the second cell to use the first bandwidth such that all of the first sub-bandwidths are available.

2. The method according claim 1, wherein each of the first sub-bandwidths comprises a starting value and an ending value, and the starting value and the ending value of the first sub-bandwidth are calculated as follows:

$$\begin{cases} S_i = (i-1)\left\lfloor \dfrac{N_{PRB}}{K} \right\rfloor \\ E_i = i\left\lfloor \dfrac{N_{PRB}}{K} \right\rfloor \end{cases}$$

wherein i represents a corresponding sub-bandwidth sequence number of the first sub-bandwidth, K represents the number of the first sub-bandwidths, Si represents the starting value of the first sub-bandwidth, Ei represents the ending value of the first sub-bandwidth, $N_{PRB}$ represents an available frequency resource of physical resource blocks (PRBs), and $\lfloor x \rfloor$ represents a maximum integer which does not exceed x.

3. An adaptive regulating method for indoor network coverage, comprising steps:

A. performing, by each of a plurality of cells, steps of: detecting at least one corresponding neighboring cell of each of the plurality of cells, obtaining a list of the at least one corresponding neighboring cell, and sending the list of the at least one corresponding neighboring cell to a network managing center;

B. performing, by the network managing center, steps of: generating a correlating information among the plurality of cells based on the list of the at least one corresponding neighboring cell of each of the plurality of cells, assigning first sub-bandwidths to the plurality of cells such that a number of the first sub-bandwidths is at a minimum according to the correlating information, and dividing a first bandwidth into the plurality of first sub-bandwidths;

C. performing, by the network managing center, steps of: in response to the plurality of the cells comprising a first cell for which a group of the first cell and the at least one corresponding neighboring cell is assigned second sub-bandwidths having a number of the second sub-bandwidths fewer than the number of the first sub-bandwidths, causing the first cell to use the first bandwidth such that one of the first sub-bandwidths is preserved, and in response to the plurality of the cells further comprising a second cell for which a group of the second cell and the at least one corresponding neighboring cell is assigned third sub-bandwidths having a number of the third sub-bandwidths same as the number of the first sub-bandwidths, causing the second cell to use the first bandwidth such that all of the first sub-bandwidths are available.

4. The method according to claim 3, wherein for the step A, each of the plurality of cells perform steps of:

A1. detecting, by a cell comprising a receiver, a target cell using the receiver, wherein the receiver is an embedded user terminal receiver;

A2. recognizing, by the cell comprising the receiver, the target cell as a neighboring cell and adding the target cell into the list of the at least one corresponding neighboring cell in response to detecting that a receiving power of a reference signal of the target cell is greater than a predetermined power intensity threshold; and A3. sending, by the cell comprising the receiver, the list of the at least one corresponding neighboring cell to the network managing center.

5. The method according to claim 4, wherein after the step A2, the method further comprises:

scanning, by the cell comprising the receiver, the neighboring cell and obtaining a scanning result; and updating, by the cell comprising the receiver, the list of the at least one corresponding neighboring cell according to the scanning result.

6. The method according to claim 5, wherein after updating the list of the at least one corresponding neighboring cell, the method further comprises: notifying, by the cell, the network managing center to update the correlating information.

7. The method according to claim 3, wherein the step B comprises:

B1. establishing a relational chart of the plurality of cells according to the correlating information;

B2. adding all cells on the relational chart into an unassigned group;

B3. randomly choosing a current first cell from the unassigned group, assigning a current sub-bandwidth sequence number to the current first cell, adding the current first cell into a current sub-bandwidth group corresponding to the current sub-bandwidth sequence number, and removing the current first cell from the unassigned group;

B4. randomly choosing a current second cell from the unassigned group, determining whether the current second cell is adjacent to one of at least one cell in the current sub-bandwidth group, if so, keeping the current second cell in the unassigned group, and if not, assigning the current sub-bandwidth sequence number to the current second cell, adding the current second cell into the current sub-bandwidth group, and removing the current second cell from the unassigned group;

B5. iteratively performing the step B4 for a next cell different from the current second cell in the unassigned group until all the cells on the relational chart have been processed with respect to the current sub-bandwidth group; and B6. iteratively performing the steps B3, B4 and B5 for a next cell in the unassigned group, a next sub-bandwidth sequence number and a next sub-bandwidth group until all the cells on the relational chart have been assigned sub-bandwidth sequence numbers;

wherein the assigned first sub-bandwidths to the plurality of cells correspond to the sub-bandwidth sequence numbers of all the cells on the relational chart.

8. The method according to claim 7, wherein the step B6 further comprises:

obtaining a maximum of the sub-bandwidth sequence numbers of all the cells on the relational chart; and setting the maximum sub-bandwidth sequence number as the number of the first sub-bandwidths whereby the number of the first sub-bandwidths is at the minimum.

9. The method according to claim 3, wherein each of the first sub-bandwidths comprises a starting value and an ending value, and the starting value and the ending value of the first sub-bandwidth are calculated as follows:

$$\begin{cases} S_i = (i-1)\left\lfloor \dfrac{N_{PRB}}{K} \right\rfloor \\ E_i = i\left\lfloor \dfrac{N_{PRB}}{K} \right\rfloor \end{cases}$$

wherein i represents a corresponding sub-bandwidth sequence number of the first sub-bandwidth, K represents the number of the first sub-bandwidths, $S_i$ represents the starting value of the first sub-bandwidth, $E_i$ represents the ending value of the first sub-bandwidth, $N_{PRB}$ represents an available frequency resource of physical resource blocks (PRBs), and $\lfloor x \rfloor$ represents a maximum integer which does not exceed x.

10. The method according to claim 3, wherein in step C, the step of causing the first cell to use the first bandwidth such that one of the first sub-bandwidths is preserved comprises:

notifying the first cell that the assigned first sub-bandwidth to the first cell is preserved; and the step of causing the second cell to use the first bandwidth such that all of the first sub-bandwidths are available comprises:

notifying the second cell that the assigned first sub-bandwidth to the second cell is available.

11. The method according to claim 10, further comprises:

if the group of the first cell and the at least one corresponding neighboring cell is assigned the second sub-bandwidths having the number of the second sub-bandwidths fewer than the number of the first sub-bandwidths, notifying each of the at least one corresponding neighboring cell of the first cell that the assigned first sub-bandwidth to the neighboring cell of the first cell is preserved, and if the group of the second cell and the at least one corresponding neighboring cell is assigned the third sub-bandwidths having the number of the third sub-bandwidths same as the number of the first sub-bandwidths, notifying each of the at least one corresponding neighboring cell of the second cell that the assigned first sub-bandwidth to the neighboring cell of the second cell is available.

12. An adaptive regulating system for indoor network coverage, comprising:

a network managing center; and a plurality of cells, each configured to perform steps of:

detecting at least one corresponding neighboring cell of each of the plurality of cells, obtaining a list of the at least one corresponding neighboring cell, sending the list of the at least one corresponding neighboring cell to the network managing center;

wherein the network managing center comprises a processor executing steps of:

generating a correlating information among the plurality of cells based on the list of the at least one corresponding neighboring cell of each of the plurality of cells;

assigning first sub-bandwidths to the plurality of cells such that a number of the first sub-bandwidths is at a minimum according to the correlating information, and dividing a first bandwidth into the plurality of first sub-bandwidths; and in response to the plurality of the cells comprising a first cell for which a group of the first cell and the at least one corresponding neighboring cell is assigned second sub-bandwidths having a number of the second sub-bandwidths fewer than the number of the first sub-bandwidths, causing the first cell to use the first bandwidth such that one of the first sub-bandwidths is preserved, and in response to the plurality of the cells further comprising a second cell for which a group of the second cell and the at least one corresponding neighboring cell is assigned third sub-bandwidths having a number of the third sub-bandwidths same as the number of the first sub-bandwidths, causing the second cell to use the first bandwidth such that all of the first sub-bandwidths are available.

13. The system according to claim 12, wherein each of the plurality of cells comprises:

a receiver, wherein the receiver is an embedded user terminal receiver;

wherein each of the plurality of cells executes steps of:

detecting a target cell using the receiver;

recognizing the target cell as a neighboring cell and adding the target cell into the list of the at least one corresponding neighboring cell in response to detecting that a receiving power of a reference signal of the target cell is greater than a predetermined power intensity threshold; and sending the list of the at least one corresponding neighboring cell to the network managing center.

14. The system according to claim 13, wherein each of the plurality of cells further executes steps of:

scanning the neighboring cell and obtaining a scanning result after the step of recognizing; and updating the list of the at least one corresponding neighboring cell according to the scanning result.

15. The system according to claim 14, wherein the each of the plurality of cells further executes a step of:

notifying the network managing center to update the correlating information after the step of updating.

16. The system according to claim 12, wherein the processor further executes steps:

B1. establishing a relational chart of the plurality of cells according to the correlating information;

B2. adding all cells on the relational chart into an unassigned group;

B3. randomly choosing a current first cell from the unassigned group, assigning a current sub-bandwidth sequence number to the current first cell, adding the current first cell into a current sub-bandwidth group corresponding to the current sub-bandwidth sequence number, and removing the current first cell from the unassigned group;

B4. randomly choosing a current second cell from the unassigned group, determining whether the current second cell is adjacent to one of at least one cell in the current sub-bandwidth group, if so, keeping the current second cell in the unassigned group, and if not, assigning the current sub-bandwidth sequence number to the current second cell, adding the current second cell into the current sub-bandwidth group, and removing the current second cell from the unassigned group;

B5. iteratively performing the step B4 for a next cell different from the current second cell in the unassigned group until all the cells on the relational chart have been processed with respect to the current sub-bandwidth group; and B6. iteratively performing the step B3, B4, and B5 for a next cell in the unassigned group, a next sub-bandwidth sequence number and a next sub-bandwidth group until all the cells on the relational chart have been assigned sub-bandwidth sequence numbers;

wherein the assigned first sub-bandwidths to the plurality of cells correspond to the sub-bandwidth sequence numbers of all the cells on the relational chart.

17. The system according to claim 16, wherein the processor further executes steps of:

obtaining a maximum of the sub-bandwidth sequence numbers of all the cells on the relational chart; and setting the maximum sub-bandwidth sequence number as the number of the first sub-bandwidths whereby the number of the first sub-bandwidths is at the minimum.

18. The system according to claim 12, wherein each of the first sub-bandwidths comprises a starting value and an ending value, and the starting value and the ending value of the first sub-bandwidth are calculated as follows:

$$\begin{cases} S_i = (i-1)\left\lfloor \dfrac{N_{PRB}}{K} \right\rfloor \\ E_i = i\left\lfloor \dfrac{N_{PRB}}{K} \right\rfloor \end{cases}$$

wherein i represents a corresponding sub-bandwidth sequence number of the first sub-bandwidth, K represents the number of the first sub-bandwidths, $S_i$ represents the starting value of the first sub-bandwidth, $E_i$ represents the ending value of the first sub-bandwidth, $N_{PRB}$ represents an available frequency resource of physical resource blocks (PRBs), and $\lfloor x \rfloor$ represents a maximum integer which does not exceed x.

19. The system according to claim 12, wherein:

the step of causing the first cell to use the first bandwidth such that one of the first sub-bandwidths is preserved comprises:

notifying the first cell that the assigned first sub-bandwidth to the first cell is preserved; and the step of causing the second cell to use the first bandwidth such that all of the first sub-bandwidths are available comprises:

notifying the second cell that the assigned first sub-bandwidth to the second cell is available.

20. The system according to claim 19 wherein processor further executes steps of:

in response to the group of the first cell and the at least one corresponding neighboring cell being assigned the second sub-bandwidths having the number of the second sub-bandwidths fewer than the number of the first sub-bandwidths, notifying each of the at least one corresponding neighboring cell of the first cell that the assigned first sub-bandwidth to the neighboring cell of the first cell is preserved, and in response to the group of the second cell and the at least one corresponding neighboring cell being assigned the third sub-bandwidths having the number of the third sub-bandwidths same as the number of the first sub-bandwidths, notifying each of the at least one corresponding neighboring cell of the second cell that the assigned first sub-bandwidth to the neighboring cell of the second cell is available.

* * * * *